United States Patent [19]

Seike et al.

[11] Patent Number: 4,983,556

[45] Date of Patent: Jan. 8, 1991

[54] HIGH STRENGTH PORCELAINS FOR USE IN INSULATORS AND PRODUCTION THEREOF

[75] Inventors: Shoji Seike, Nagoya; Noriyasu Oguri, Hashima; Hiroshi Harada, Handa; Junichi Ishikawa, Konan, all of Japan

[73] Assignee: NGK Insulators, Ltd., Japan

[21] Appl. No.: 159,732

[22] Filed: Feb. 24, 1988

[30] Foreign Application Priority Data

Mar. 6, 1987 [JP] Japan .................................. 62-50390

[51] Int. Cl.$^5$ ..................... C04B 33/24; C04B 35/10
[52] U.S. Cl. ................................... 501/143; 501/144; 501/153
[58] Field of Search ............................... 501/153, 143

[56] References Cited

U.S. PATENT DOCUMENTS

| | | | |
|---|---|---|---|
| 3,758,318 | 9/1973 | Farris et al. | 501/128 |
| 4,183,760 | 1/1980 | Funk et al. | 501/144 |
| 4,717,695 | 1/1988 | Oda | 501/153 |

FOREIGN PATENT DOCUMENTS 836596 4/1976 Belgium .

OTHER PUBLICATIONS

Chemical Abstracts, vol. 104, No. 8, 1986, p. 277, Abstract No. 55127t, Columbus, OH, US; P. D. D. Rodrigo et al.: "High purity mullite ceramics by reaction sintering", & Int. J. High Technol. Ceram. 1985, 1(1), 3-30.

*Primary Examiner*—Mark L. Bell
*Attorney, Agent, or Firm*—Parkhurst, Wendel & Rossi

[57] ABSTRACT

High strength alumina porcelains for use in insulators are disclosed herein, in which the maximum particle diameter of quartz grians remaining in the porcelains is not more than 40 μm. A process for producing such high strength alumina porcelains for use in insulators comprises the steps of mixing the alumina of a controlled grain size which is decomposed in a single crystalline state and in which the 50% average particle diameter is in a range from 4 to 14 μm, raw materials ground finely which are selected from the group consisting essentially of feldspar, silica sand, and china stone, and clay together, forming the thus obtained mixture, and drying and firing the formed body.

2 Claims, 5 Drawing Sheets

FIG_3a
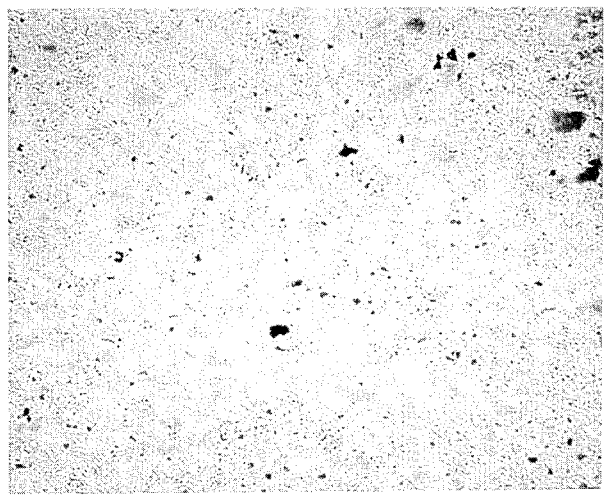
100 μm
FIG_3b
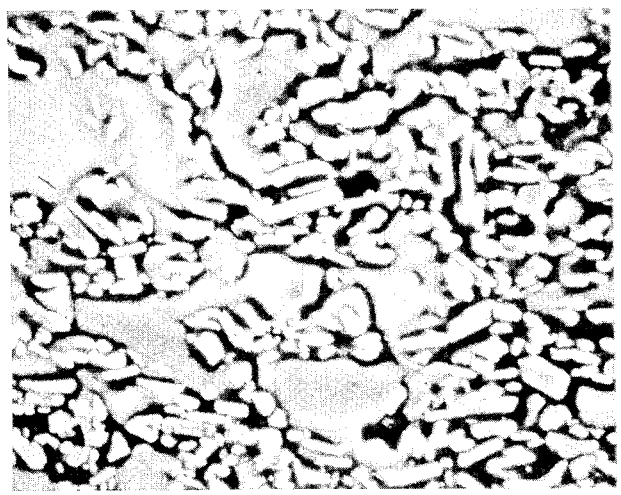
10 μm

FIG_4a
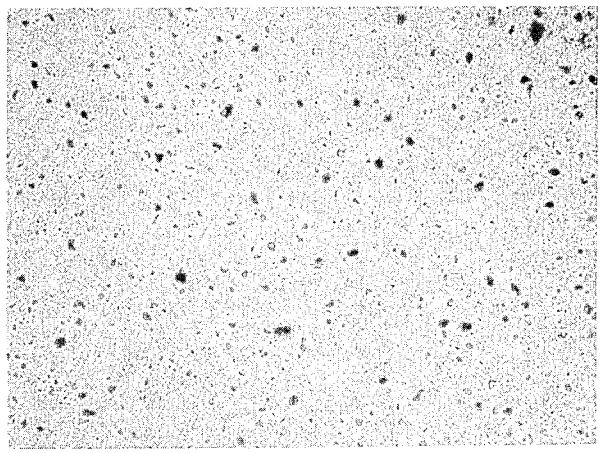
100μm
FIG_4b
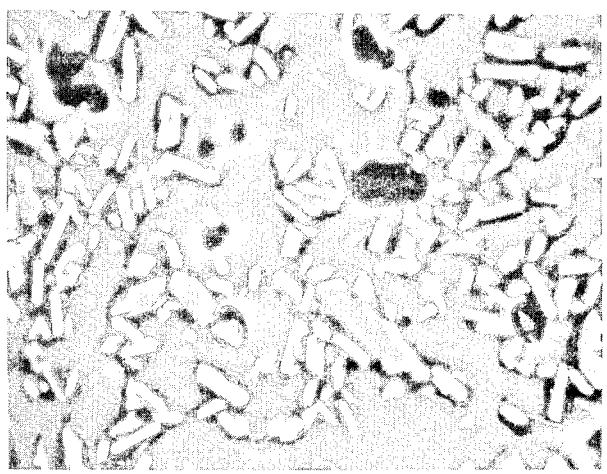
10μm

HIGH STRENGTH PORCELAINS FOR USE IN INSULATORS AND PRODUCTION THEREOF

BACKGROUND OF THE INVENTION (1) Field of the Invention

The present invention relates to high strength, porcelains which can favorably be used for insulators necessitating high strength and to a process for producing the same.

(2) Related Art Statement

There have formerly been demands to increase the strength of insulators, and thus development of high strength porcelains has been expected.

In order to obtain high strength porcelains, it is known that an amount of alumina in porcelains is increased or the grain size of bodies is made finer.

However, among the above conventional techniques for producing high strength porcelains, increasing the amount of alumina in porcelains must inevitably use a great amount of expensive alumina, which raises production cost of insulators. Further, although strength is increased, formability is deteriorated.

On the other hand, in the technique to make the grain size of bodies finer, the bodies are likely to crack due to shrinkage during forming, drying or firing of insulators.

SUMMARY OF THE INVENTION

It is an object of the present invention to obviate the above-mentioned drawbacks, and to provide high strength porcelains for use in insulators and a process for producing the same, in which porcelains having higher strength can be obtained by specifying the mixed composition of the insulator porcelains and the grain size of raw materials constituting them with the same amount of alumina in porcelains as conventionally employed.

The high strength porcelain for use in insulators according to the present invention is characterized in that the maximum particle diameter of quartz grains remaining in the porcelain is not more than 40μm.

The process for producing high strength porcelains for use in insulators according to the present invention comprises the steps of mixing alumina having a controlled grain size which is decomposed in a single crystalline state and in which the 50% average particle diameter is in a range from 4 to 14 μm, other raw materials ground finely such as feldspar, silica sand, and china stone, clay, etc., together, forming the thus obtained mixture, and drying and firing the formed bodies.

By the above-mentioned construction, porcelains having higher strength can be obtained with the same amount of alumina in porcelains as conventionally employed without losing sintering and drying properties, and electric performances by controlling the grain size of alumina, which is decomposed in the single crystalline state, and controlling the grain size of the other raw materials suitably while the grain size of bodies is equal to that of the conventional bodies.

While the maximum particle diameter of quartz grains remaining in the conventional porcelains is in a range from about 60 to 100 μm, that of quartz grains remaining in the porcelains produced according to the above-mentioned process of the present invention is not more than 40 μm. Thus, the porcelain construction itself greatly differs between the conventional porcelains and the invention porcelains. In the present invention, high strength porcelains are obtained by restricting the maximum particle diameter of the quartz grains and employing the alumina with a controlled grain size in the porcelains.

These and other objects, features, and advantages of the present invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of the claims appended hereto.

BRIEF DESCRIPTION OF THE ATTACHED DRAWINGS

For a better understanding of the invention, reference is made to the attached drawings, wherein.

Figure 5:
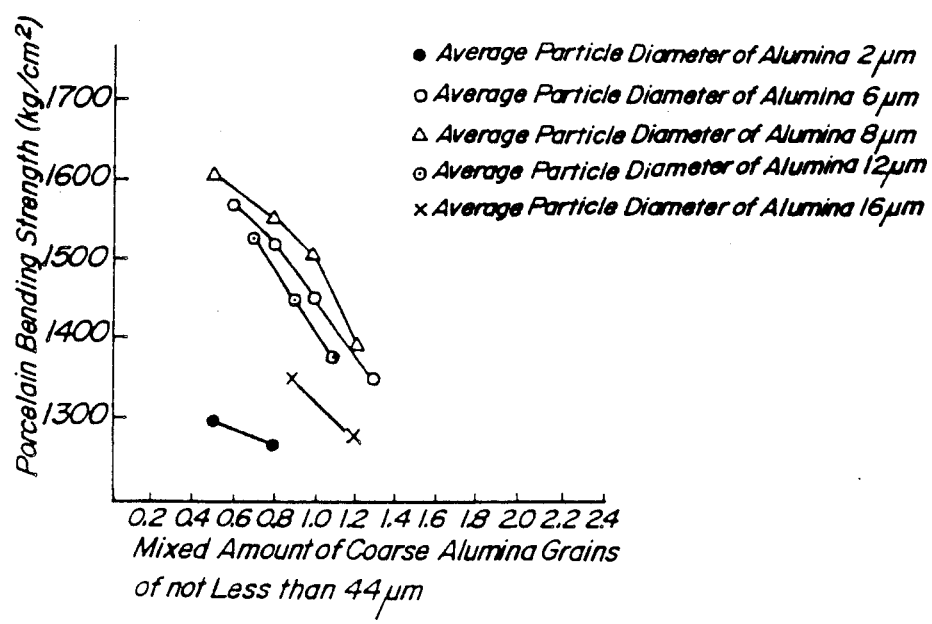

FIGS. 3(a) and (b) are SEM (Scanning Electron Microscope) photographs showing the crystalline structure of a conventional porcelain;

FIGS. 4(a) and (b) are SEM photographs showing the crystalline structure of a porcelain according to the present invention; and FIG. 5 is a graph showing the relation between the mixed amount of the alumina of the controlled grain size of not less than 44 μm in particle diameter and bending strength of porcelains.

DETAILED DESCRIPTION OF THE INVENTION

First, reasons for limitations given in the present invention will be explained as follows.

The reason why the 50% average particle diameter of alumina is defined to a range from 4 to 14 μm in the present invention is to specify the amount of the alumina of a controlled grain size used in porcelains. If it is less than 4 μm or more than 14 μm, desired porcelain strength cannot be obtained.

If coarse alumina grains having a particle diameter of 44 μm or more exceeds 1% by weight, desired porcelain strength is difficult to attain. Thus, it is preferable that the amount of coarse alumina grains of not less than 44 μm is not more than 1% by weight.

Further, the amount of alumina used in the present invention is preferably in a range from 20 to 60% by weight, because desired porcelain strength is difficult to obtain if it is less than 20% by weight or more than 60% by weight.

In the following, examples of the present invention will be explained in more detail. These examples are given merely in illustration of the invention, but should never be interpreted to limit the scope thereof.

EXAMPLE 1

First, the relation among the amount of alumina, the grain size of alumina, and various characteristics of porcelains were examined.

In order to obtain test porcelains, alumina, feldspar, silica sand, china stone and clay were wet mixed containing 50% by weight of water. The average grain size of alumina had preliminarily been adjusted to a given value by grinding and classifying. The slurry obtained by the above process was dewatered by a filter press to have the water content of from 20 to 25% by weight, and was extruded by a vacuum pug mill, thereby obtaining a formed body in a desired form. The formed body was then dried at 110° C inside an electrically heating drier to have the water content of 1% by weight or less. The dried shaped body was fired in air according to such a firing schedule that it was maintained for 1 hour at the maximum temperature of 1,300° C.

With respect to the obtained test porcelains, porcelain bending strength, porcelain dielectric strength, sintering, and drying properties were examined.

The bending strength of porcelain was measured by an electron type load tester (the maximum test load: 500 kg, manufactured by Tokyo Shiken Kabushiki Kaisha) according to JIS-C2141 (Testing method of ceramic insulators for electrical and electronic applications) with respect to rods (10 mmΦ×120 mml).

The dielectric strength of porcelain was measured by a dielectric strength tester (manufactured by Toyo Denki Seizo Kabushiki Kaisha) according to JIS-C2110 (Testing method of dielectric strength of solid materials for electric insulation) with respect to circular test pieces having a diameter of 50 mmφ and a thickness of 2 mm.

The sintering temperature of porcelain was tested according to the moisture-absorbing method in JIS-C3801 (insulator-testing method) by using the same test pieces as used in the measurement of the bending strength of porcelain. Results are indicated by O and X which mean test pieces sintered when being fired at 1,300° C. for 1 hour and those not sintered by the same firing process, respectively.

Figure 1:
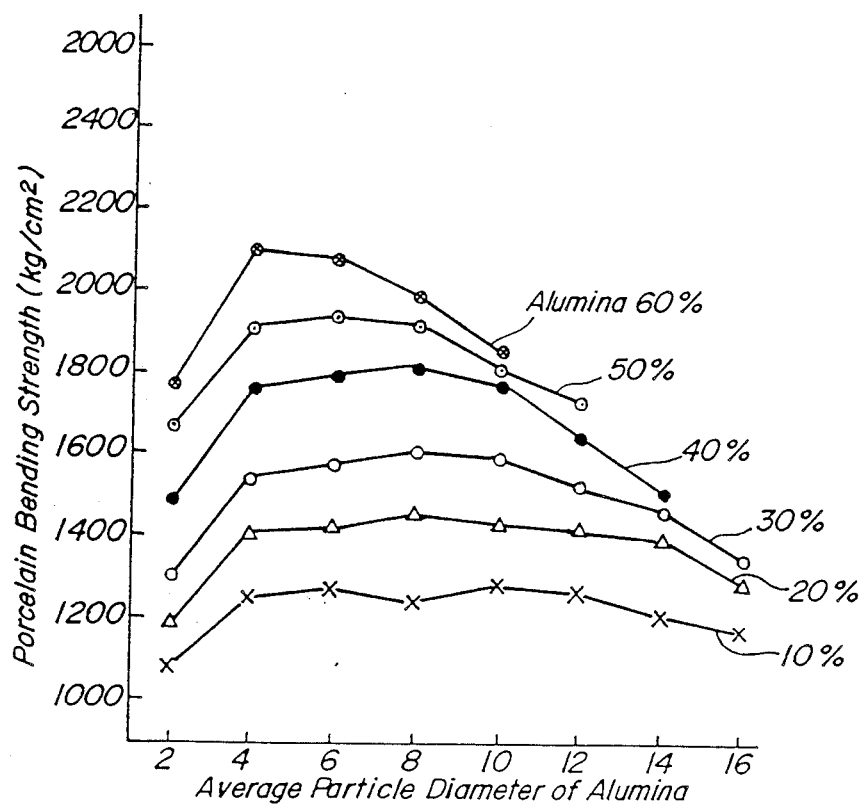
FIG. 1 is a graph showing the relation among the particle diameter of alumina, the amount of alumina, and bending strength of porcelains.

The drying property was evaluated by visually examining whether cracks occurred or not with respect to test pieces having a diameter of 80 mmφ and a length of 200 mm which had been obtained by extrusion-forming a body with a vacuum pug mill, drying the formed bodies at a temperature of 40° C. under a relative humidity of 80% in a thermostat-humidistat vessel for 24 hours, and then drying them at 90° C. for 24 hours in an electrically heating drier. Results are indicated in FIG. 1 by O and X which denote test pieces free from cracks and those cracked, respectively.

Since Comparative Example Nos. 12–15 containing 70% by weight of alumina in Table 1 could not be formed, bending strength or dielectric strength could not be measured.

TABLE 1(a)

| | Present invention | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Mixing ratio (wt %) | | | | | | | | | | | | |
| Alumina | | | | 20 | | | | | | 30 | | |
| Feldspar | | | | 30 | | | | | | 30 | | |
| Silica sand | | | | 10 | | | | | | 5 | | |
| China stone | | | | 10 | | | | | | 5 | | |
| Clay | | | | 30 | | | | | | 30 | | |
| Grain size | | | | | | | | | | | | |
| 50% Average particle diameter of alumina (μm) | 4 | 6 | 8 | 10 | 12 | 14 | 4 | 6 | 8 | 10 | 12 | 14 |
| 50% Average particle diameter of entire body (μm) | | | | 7 | | | | | | 7 | | |
| Mixed ratio of alumina having not less than 44 μm in particle diameter wt. (%) | 0.7 | 0.6 | 0.5 | 0.8 | 0.7 | 0.8 | 0.7 | 0.6 | 0.5 | 0.8 | 0.7 | 0.8 |
| Characteristics | | | | | | | | | | | | |
| Bending strength (kg/cm²) | 1410 | 1430 | 1460 | 1440 | 1420 | 1400 | 1540 | 1570 | 1610 | 1600 | 1530 | 1470 |
| Dielectric strength (kV/mm) | 15.1 | 15.1 | 15.3 | 15.3 | 15.1 | 14.7 | 14.9 | 15.0 | 15.1 | 14.8 | 14.7 | 14.6 |
| Sintering property | O | O | O | O | O | O | O | O | O | O | O | O |
| Drying property | O | O | O | O | O | O | O | O | O | O | O | O |

TABLE 1(b)

| | Present invention | | | | | | | | | | |
|---|---|---|---|---|---|---|---|---|---|---|---|
| | 13 | 14 | 15 | 16 | 17 | 18 | 19 | 20 | 21 | 22 | 23 |
| Mixing ratio (wt %) | | | | | | | | | | | |
| Alumina | | | | 40 | | | | | 50 | | |
| Feldspar | | | | 30 | | | | | 25 | | |
| Silica sand | | | | 0 | | | | | 0 | | |
| China stone | | | | 0 | | | | | 0 | | |
| Clay | | | | 30 | | | | | 25 | | |
| Grain size | | | | | | | | | | | |
| Average particle diameter of alumina (μm) | 4 | 6 | 8 | 10 | 12 | 14 | 4 | 6 | 8 | 10 | 12 |
| 50% Average particle diameter of entire body (μm) | | | | 7 | | | | | 7 | | |
| Mixed ratio of alumina having not less than 44 μm in particle diameter wt. (%) | 0.7 | 0.6 | 0.5 | 0.8 | 0.7 | 0.8 | 0.7 | 0.6 | 0.5 | 0.8 | 0.7 |
| Characteristics | | | | | | | | | | | |
| Bending strength (kg/cm²) | 1760 | 1800 | 1820 | 1780 | 1650 | 1510 | 1910 | 1940 | 1930 | 1830 | 1740 |
| Dielectric strength (kV/mm) | 14.6 | 14.8 | 14.6 | 14.7 | 14.4 | 14.2 | 14.2 | 14.3 | 14.2 | 14.3 | 13.9 |
| Sintering property | O | O | O | O | O | O | O | O | O | O | O |
| Drying property | O | O | O | O | O | O | O | O | O | O | O |

TABLE 1(c)

|  | Present invention | | | | Comparative example | | | | | | |
|---|---|---|---|---|---|---|---|---|---|---|---|
|  | 24 | 25 | 26 | 27 | 1 | 2 | 3 | 4 | 5 | 6 | 7 |
| Mixing ratio (wt %) | | | | | | | | | | | |
| Alumina |  | 60 | | | | | | 10 | | | |
| Feldspar |  | 20 | | | | | | 30 | | | |
| Silica sand |  | 0 | | | | | | 10 | | | |
| China stone |  | 0 | | | | | | 20 | | | |
| Clay |  | 20 | | | | | | 30 | | | |
| Grain size | | | | | | | | | | | |
| 50% Average particle diameter of alumina ($\mu$m) | 4 | 6 | 8 | 10 | 4 | 6 | 8 | 10 | 12 | 14 | 16 |
| 50% Average particle diameter of entire body ($\mu$m) |  | 7 | | | | | | 7 | | | |
| Mixed ratio of alumina having not less than 44 $\mu$m in particle diameter (wt. %) | 0.7 | 0.6 | 0.5 | 0.8 | 0.7 | 0.6 | 0.5 | 0.8 | 0.7 | 0.8 | 0.9 |
| Characteristics | | | | | | | | | | | |
| Bending strength (kg/cm$^2$) | 2100 | 2090 | 2000 | 1860 | 1250 | 1270 | 1240 | 1290 | 1260 | 1210 | 1180 |
| Dielectric strength (kV/mm) | 13.8 | 13.9 | 13.8 | 13.7 | 15.3 | 15.4 | 15.5 | 15.2 | 15.0 | 14.8 | 14.5 |
| Sintering property | O | O | O | O | O | O | O | O | O | O | O |
| Drying property | O | O | O | O | O | O | O | O | O | O | O |

TABLE 1(d)

|  | Comparative example | | | | | | | | Conventional product | | | |
|---|---|---|---|---|---|---|---|---|---|---|---|---|
|  | 8 | 9 | 10 | 11 | 12 | 13 | 14 | 15 | 1 | 2 | 3 | 4 |
| Mixing ratio (wt %) | | | | | | | | | | | | |
| Alumina | 20 | 30 | 50 | 60 |  | 70 | | | 10 | 20 | 30 | 40 |
| Feldspar | 30 | 30 | 25 | 20 |  | 20 | | | 30 | 30 | 30 | 30 |
| Silica sand | 10 | 5 | 0 | 0 |  | 0 | | | 10 | 10 | 5 | 0 |
| China stone | 10 | 5 | 0 | 0 |  | 0 | | | 20 | 10 | 5 | 0 |
| Clay | 30 | 30 | 25 | 20 |  | 10 | | | 30 | 30 | 30 | 30 |
| Grain size | | | | | | | | | | | | |
| 50% Average particle diameter of alumina ($\mu$m) | 16 | 16 | 2 | 2 | 2 | 4 | 6 | 8 | 2 | 2 | 2 | 2 |
| Average particle diameter of entire body ($\mu$m) |  |  |  | 7 | | | | |  | 7 | | |
| Mixed ratio of alumina having not less than 44 $\mu$m in particle diameter (wt. %) | 0.9 | 0.9 | 0.5 | 0.5 | 0.5 | 0.7 | 0.6 | 0.5 | 0.5 | 0.5 | 0.5 | 0.5 |
| Characteristics | | | | | | | | | | | | |
| Bending strength (kg/cm$^2$) | 1300 | 1350 | 1670 | 1770 | — | — | — | — | 1080 | 1190 | 1300 | 1490 |
| Dielectric strength (kV/mm) | 14.3 | 14.2 | 14.0 | 13.7 | — | — | — | — | 14.9 | 14.8 | 14.6 | 14.3 |
| Sintering property | O | O | O | O | — | — | — | — | O | O | O | O |
| Drying property | O | O | O | O | X | X | X | X | O | O | O | O |

As is clear from the results in Table 1, it was confirmed that when the 50% average particle diameter of alumina was in a range from 4 to 14 $\mu$m, porcelains having excellent characteristics and high strength could be obtained irrespective of the amount of alumina used. Among the porcelains fitting this requirement, it was found that those having the amount of the alumina of from 20% by weight to 60% by weight were preferable, because bending strength of not less than 1,400 (kg/cm$^2$) could be obtained and other characteristics of porcelain were satisfied in this range.

From the results obtained, the relation among the 50% average particle diameter of alumina, the amount of alumina used, and the porcelain bending strength is shown in FIG. 1.

Figure 2:
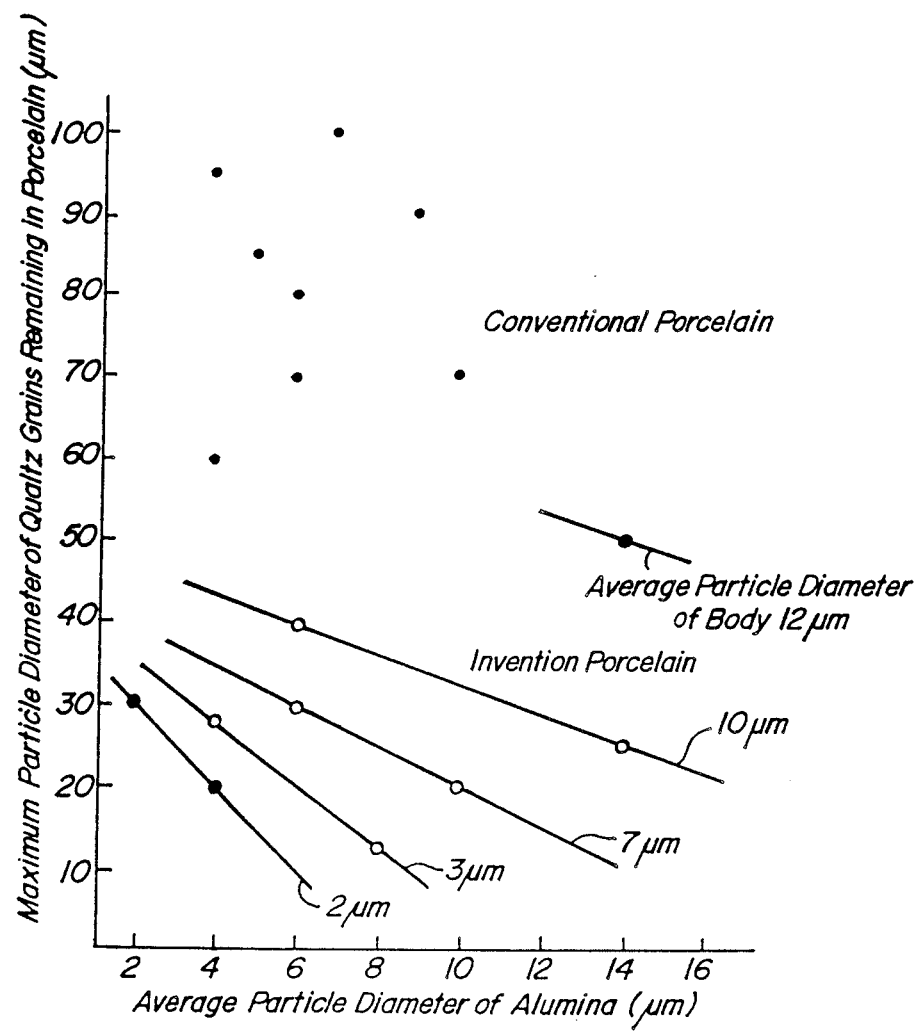
FIG. 2 is a graph showing the relation between the 50% average particle diameter of alumina and the maximum diameter of quartz grains remaining in the porcelains.

With respect to the porcelains according to the present invention as obtained above and conventional porcelains without the alumina being controlled in the grain size, the maximum particle diameters of quartz grains remaining in the porcelains in which the amount of alumina in porcelain was 30% were determined from microscopic photographs thereof. The relation between the average particle diameter of alumina and the maximum particle diameter of the quartz grains remaining in the porcelains is shown in FIG. 2. From FIG. 2, it was confirmed that the maximum particle diameter of the quartz grains in the porcelains according to the present invention was smaller than in the conventional porcelains, and was not than 40 $\mu$m.

In FIGS. 3 and 4 are shown SEM photographs of a conventional porcelain (alumina content: 30% by weight, alumina average particle diameter: 6 $\mu$m, average particle size of body: 10 $\mu$m) and a porcelain according to the present invention (alumina content: 30% by weight, alumina average particle diameter: 6 $\mu$m, average particle diameter of body: 7 $\mu$m), respectively. FIGS. 3(a) and (b) are ×100 and ×1,000 SEM photographs of the conventional porcelain, respectively. It is characteristic of the conventional porcelain that it contains a lot of large sized quartz grains and small size alumina grains alumina. FIGS. 4(a) and (b) are ×100 and ×1,000 SEM photographs of the porcelain according to the present invention, respectively. It is characteristic of the invention that the porcelain contains few large sized quartz grains and small size alumina grains. In FIGS. 3 and 4, black portions, gray portions and white portions are pores, residual quartz, and alumina, respectively.

Example 2

Test porcelains having grain sizes and compositions shown in Table 2 were prepared in the same manner as in Example 1. Then, the same characteristics as in Example 1 were measured, and the relation between the 50% average particle diameter of the bodies and the characteristics measured was examined. Results are shown in Table 2.

TABLE 2

| | Present invention | | | | | | | | Comparative example | | | Conventional product |
|---|---|---|---|---|---|---|---|---|---|---|---|---|
| | 28 | 29 | 30 | 31 | 32 | 33 | 34 | 35 | 16 | 17 | 18 | 5 |
| Mixing ratio (wt %) | | | | | | | | | | | | |
| Alumina | | 30 | | | | 30 | | | | 30 | | 30 |
| Feldspar | | 30 | | | | 30 | | | | 30 | | 30 |
| Silica sand | | 3 | | | | 3 | | | | 3 | | 3 |
| China stone | | 7 | | | | 7 | | | | 7 | | 7 |
| Clay | | 30 | | | | 30 | | | | 30 | | 30 |
| Grain size | | | | | | | | | | | | |
| 50% Average particle diameter of alumina (μm) | | 6 | | | | 4 | | | 6 | | 4 | 2 |
| 50% Average particle diameter of entire body (μm) | 3 | 5 | 7 | 10 | 3 | 5 | 7 | 10 | 12 | 2 | 12 | 2 |
| Mixed ratio of alumina having not less than 44 μm in particle diameter (wt. %) | | 0.6 | | | | 0.7 | | | 0.6 | | 0.7 | 0. |
| Characteristics | | | | | | | | | | | | |
| Bending strength (kg/cm²) | 1630 | 1610 | 1560 | 1540 | 1600 | 1590 | 1550 | 1500 | — | — | — | — |
| Dielectric strength (kV/mm) | 15.8 | 15.6 | 14.8 | 14.2 | 15.5 | 15.3 | 14.8 | 14.3 | — | — | — | — |
| Sintering property | O | O | O | O | O | O | O | O | X | — | X | — |
| Drying property | O | O | O | O | O | O | O | O | O | X | O | X |

From the results in Table 2, it is seen that porcelains in which the 50% average particle diameter of the body was in a range from 3 to 10 μm had more excellent sintering and drying properties.

Since Comparative Examples 16, 17, and 18 had poor sintering and drying properties, their bending strength or dielectric strength could not be measured.

EXAMPLE 3

Test porcelains having grain sizes and compositions shown in Table 3 were prepared in the same manner as in Example 1, and bending strength and dielectric strength were measured by the same ways as in Example 1. Further, the relation between the mixed rate of alumina coarse grains of not less than 44 μm and the characteristics was examined. Results are shown in Table 3.

TABLE 3

| | Present invention | | | | | | | |
|---|---|---|---|---|---|---|---|---|
| | 36 | 37 | 38 | 39 | 40 | 41 | 42 | 43 |
| Mixing ratio (wt %) | | | | | | | | |
| Alumina | | | | | 30 | | | |
| Feldspar | | | | | 30 | | | |
| Silica sand | | | | | 2 | | | |
| China stone | | | | | 3 | | | |
| Clay | | | | | 35 | | | |
| Grain size | | | | | | | | |
| 50% Average particle diameter of alumina (μm) | | 6 | | | 8 | | 12 | |
| 50% Average particle diameter of entire body (μm) | | | | | 7 | | | |
| Mixed ratio of alumina having not less than 44 μm in particle diameter (%) | 0.6 | 0.8 | 1.0 | 0.5 | 0.8 | 1.0 | 0.7 | 0.9 |
| Characteristics | | | | | | | | |
| Bending strength (kg/cm²) | 1580 | 1520 | 1450 | 1600 | 1520 | 1450 | 1520 | 1450 |
| Dielectric strength (kV/mm) | 15.1 | 14.5 | 13.9 | 15.0 | 14.7 | 14.2 | 14.6 | 13.6 |

| | Comparative example | | | | | Conventional product | |
|---|---|---|---|---|---|---|---|
| | 19 | 20 | 21 | 22 | 23 | 6 | 7 |
| Mixing ratio (wt %) | | | | | | | |
| Alumina | | | | 30 | | 30 | 30 |
| Feldspar | | | | 30 | | 30 | 30 |
| Silica sand | | | | 2 | | 2 | 2 |
| China stone | | | | 3 | | 3 | 3 |
| Clay | | | | 35 | | 35 | 35 |
| Grain size | | | | | | | |
| 50% Average particle diameter of alumina (μm) | 6 | 8 | 12 | 16 | | 2 | 2 |
| 50% Average particle diameter of entire body (μm) | | | 7 | | | 7 | 7 |
| Mixed ratio of alumina having not less than 44 μm in particle diameter (%) | 1.3 | 1.2 | 1.1 | 0.9 | 1.2 | 0.5 | 0.8 |

TABLE 3-continued

| Characteristics | | | | | | | |
|---|---|---|---|---|---|---|---|
| Bending strength (kg/cm²) | 1350 | 1390 | 1380 | 1360 | 1280 | 1300 | 1270 |
| Dielectric strength (kV/mm) | 13.4 | 13.6 | 13.0 | 14.0 | 13.4 | 14.6 | 14.2 |

From the results, it is seen that porcelains in which the average particle diameter of alumina fell in the range defined in the present invention and the amount of coarse grains of not less than 44 μm was not more than 1% by weight are preferable, because their bending strength was not less than 1,400 (kg/cm²).

From the obtained results, the relation between the mixed amount of coarse alumina grains of not less than 44 μm and the porcelain bending strength is shown in FIG. 5.

EXAMPLE 4

Rod-formed insulators having a barrel diameter of 105 mmφ and an entire length of 770 mm were prepared from porcelains having grain sizes and compositions shown in Table 4, and their bending strengths were measured in the state that one end was supported, whereas a load was applied to the other end. Results are shown in Table 4 together with the porcelain bending strength of test pieces having the grain sizes and compositions.

TABLE 4

|  | Conventional porcelain | Invention porcelain |
|---|---|---|
| Amount of alumina (wt %) | 30 | 30 |
| 50% Average particle diameter of alumina (μm) | 2 | 6 |
| 50% Average particle diameter of entire body (μm) | 7 | 7 |
| Average bending strength of product (kg/cm²) | 1120 δ = 54.8 | 1288 δ = 25.9 |
| Porcelain bending strength of test piece (kg/cm²) | 1280 | 1570 |

From the results in Table 4, although the average particle diameter of the bodies was the same between the conventional porcelains and the invention porcelains, the grain size of the raw materials (feldspar, china stone, silica sand) except alumina was greater in the conventional porcelain. Thus, it is seen that variations in strength of the conventional porcelain is greater and the average strength value is lower.

As is clear from the above-detailed explanation, according to the high strength porcelains for use in insulators and the process for producing the same in the present invention, high strength porcelains which have satisfactory characteristics as insulators can be obtained by controlling the larger grain size of alumina, which is decomposed in a single crystalline state coarse and making the other raw materials finer, even if the grain size of bodies is made equal to that of conventional ones.

What is claimed is:

1. A high strength procelain for use in insulators produced by:

mixing 20–60 wt % alumina powder which is decomposed in a single crystalline state, has a 50% average particle diameter of 4–14 microns, and has coarse particles with a particle diameter of not less than 44 microns present in an amount of greater than 0 wt % but less than 1 wt %, relative to the total weight of said alumina powder, with finely ground raw material selected from the group consisting of feldspar, silica sand, china stone, and clay, such that the resultant mixture of these components has a 50% average particle diameter of 3–10 microns;

shaping the resultant mixture to form a shaped body; drying the shaped body; and firing the dried, shape body; wherein quartz grains remaining in the porcelain have a maximum diameter of not greater than 40 microns.

2. A method of producing high strength porcelain for use in insulators, comprising:

mixing 20–60 wt % alumina powder which is decomposed in a single crystalline state, has a 50% average particle diameter of 4–14 microns, and has coarse particles with a particle diameter of not less than 44 microns present in an amount of greater than 0 wt % but less than 1 wt %, relative to the total weight of said alumina powder, with finely ground raw materials selected from the group consisting of feldspar, silica sand, china stone, and clay, such that a resultant mixture of these components has a 50% average particle diameter of 3–10 microns;

shaping the resultant mixture to form a shaped body; drying the shaped body; and
firing the dried, shaped body.

* * * * *